Patented Nov. 19, 1935

2,021,159

UNITED STATES PATENT OFFICE 2,021,159

METHOD OF INCREASING CARBON CONTENT OF IRON

Theodore Tafel, Jr., Ben Avon, Pa., assignor to Marie C. Tafel, Ben Avon, Pa.

No Drawing. Application April 29, 1933, Serial No. 668,634

11 Claims. (Cl. 75—27)

This invention relates to a method of treating molten metal and more particularly, to a method of treating molten scrap iron or metal that has been remelted frequently to increase the carbon content thereof.

It is well known in the art that each time a metal such as cast iron is remelted there is a loss in the carbon content of the iron and a decided increase in the sulphur content. This loss of carbon is due primarily to the fact that some of the carbon is burned out each time the metal is remelted and if the iron is in the form of a scrap, it is usually covered with an oxide which aids in the burning out of the carbon.

The gain in sulphur occurs because iron which has a great affinity for sulphur, absorbs the sulphur which is always present in the coke or other fuel used to melt the iron or scrap.

As a result of this loss in carbon and gain in sulphur on each remelting of the iron, it is apparent that if the iron has been remelted repeatedly the carbon content will drop so low and the sulphur will increase to such an extent that the molten metal becomes unworkable and unfit for the usual purposes of casting. Therefore, to use such remelted metal or scrap iron for the purpose of casting, it is necessary to increase the carbon content and decrease the sulphur therein to within such limits as will give the desired type of casting. To my knowledge the only way to utilize metal that has been remelted frequently or scrap iron in casting is to melt such metal or scrap iron in the presence of a high carbon pig iron, the remelted metal or scrap iron being of such percentage in proportion to the pig iron that it will not affect or lower the carbon content of the pig iron below the amount necessary to secure the desired type of casting.

At the present time, scrap, especially scrap purchased outside the foundry, is seldom used in a proportion greater than 25% of the total mix in most foundries. To decrease the sulphur, a desulphurizing agent such as sodium carbonate is added to the molten metal after it is drawn from the cupola and the decrease in sulphur depends on the length of time the desulphurizing agent is in contact with the molten metal and the amount of the desulphurizing agent used.

It is an object of the present invention to provide a feasible commercial process of treating molten metal to increase the carbon content and at the same time to decrease the sulphur content.

Another object is to provide a process for treating molten scrap iron or metal which has been remelted frequently to increase the carbon content whereby it is possible to approach the saturation point.

A further object is to provide a process of treating feasibly and commercially molten metal to secure a large percentage of carbon regardless of the carbon content of the metal before melting.

A still further object is to provide a method of treating cupola metal scrap iron whereby a metal will be produced having substantially all the qualities of high carbon pig iron.

These and other objects which will be hereinafter made apparent to those skilled in this particular art, are accomplished by means of this invention, one embodiment of which is hereinafter described.

Generally, my invention resides in the treating of molten scrap iron or a molten ferrous metal having a low carbon content with a mixture of carbonaceous material and an oxidizing agent whereby carbon will be liberated and absorbed by the molten metal practically instantly while at the same time the sulphur in the metal will be decreased or absorbed by the oxidizing agent.

In carying out my process the metal to be treated such as scrap iron, metal that has been remelted frequently, or a pig iron and a scrap metal mix in which the scrap represents a large proportion of the mix is melted in a cupola in the ordinary manner. After the molten metal is drawn from the cupola, a mixture of a carbonaceous material such as graphite, charcoal and the like either separately or in combination, and an oxidizing agent such as sodium or potassium nitrate, is added to the molten metal. Preferably, the mixture is added to the molten metal by pouring the metal into a ladle in which the mixture has been previously placed, or the molten metal may be poured into a revolving or shaking furnace and the mixture added while the metal is being stirred or agitated in the furnace so that it will be thoroughly mixed into the metal. The rate of adding the mixture of carbonaceous material and oxidizing agent should be so controlled that the mixture will be stirred thoroughly into the metal and sufficient time will be provided to permit the full chemical action to occur.

In preparing the mixture of the carbonizing and oxidizing agents, I prefer to employ the oxidizing agent in a proportion of approximately 15% to 30% to the carbonaceous material. The amount of the carbonaceous and oxidizing agent mixture to be added to the molten metal depends, of course, upon the total amount of carbon desired in the molten metal and I have found that by adding an amount of carbonaceous material which is approximately twice the amount theoretically needed to raise the carbon to the desired amount, I secure a metal having a high carbon content and a relatively low sulphur content. For example, I have found that to increase the carbon content and decrease the sulphur content in an iron having about 2.90% to 3.10% carbon and .180 to .20% sulphur, to a carbon content of about 3.70 and sulphur content of .10, the mixture of carbonaceous material and oxidizing agent should be added to the metal in an amount substantially twice the theoretical need to produce the 3.70% carbon.

While I have described my process for increasing the carbon content and decreasing the sulphur content by the addition of a mixture containing graphite, charcoal, or both, together with sodium or potassium nitrate and in having the sodium or potassium nitrate equal approximately 15 to 30% of the total mixture, it is to be understood that other oxidizing agents may be used, that the proportions of the oxidizing agent to the total amount of the mixture may be varied and other forms of carbon may be employed in different proportions without departing from the spirit of my invention.

It is to be further understood that under certain circumstances good results would be obtained by adding the mixture of carbonaceous material and oxidizing agent to the molten metal in other proportions than that of approximately twice the amount of carbon theoretically needed to increase the carbon content of the molten metal to the amount desired.

What I claim as new and desire to secure by Letters Patent is:

1. The method of increasing the carbon in cupola melted iron having a relatively high carbon content, which consists in adding to such molten metal after it leaves the cupola, a mixture of carbonaceous material and sodium nitrate, in which the sodium nitrate is about 20% of the total mixture.

2. The method of treating a molten metal already high in carbon to further increase the carbon content thereof, which consists in stirring a mixture of carbonaceous material and sodium nitrate into said metal, the amount of carbonaceous material in the mixture being in excess of the amount theoretically needed to raise the carbon to the desired amount, and the sodium nitrate comprising approximately 15 to 30% of the total mixture.

3. The method of preparing scrap iron for casting, which consists in melting the iron, stirring graphite and a sufficient amount of sodium nitrate to increase the carburizing effect of the graphite into the melted iron to substantially instantaneously increase the carbon and decrease the sulphur contents thereof and then casting the treated molten iron.

4. The method of increasing the carbon content and decreasing the sulphur content of iron having a deficiency in carbon and an excess of sulphur, which consists in melting the iron, pouring such melted iron into a ladle having a mixture of charcoal and sodium nitrate in the bottom thereof, the amount of charcoal in the mixture in said ladle being in excess of the theoretical carbon need and the sodium nitrate comprising approximately 15 to 30% of the mixture.

5. The method of treating cupola melted iron which consists in preparing a mixture of free carbon and potassium nitrate and stirring such mixture into the molten iron after it leaves the cupola to materially increase the carbon content thereof and simultaneously decrease the sulphur content a sufficient amount of potassium nitrate being used in the mixture to materially increase the carburizing effect of the free carbon.

6. The method of treating molten iron to practically instantaneously increase the carbon content and decrease the sulphur content thereof which consists in mixing finely flaked graphite with a sufficient amount of sodium nitrate to increase the carburizing effect of said graphite, and adding such mixture to the molten iron, the amount of flaked graphite in the mixture being substantially in excess of the theoretical carbon need.

7. The method of treating high carbon molten iron to increase the carbon content thereof to at least 3.4% carbon and decrease the sulphur content to 0.1% sulphur which consists in preparing a mixture of graphite, charcoal, and sodium nitrate in which the sodium nitrate is about 20% of the mixture, and stirring such mixture into the molten iron, the total amount of graphite and charcoal added being substantially greater than the amount theoretically needed to secure such carbon content.

8. The method herein described of treating cupola melted iron which consists in adding a carbonaceous material to said molten iron in the presence of a sufficient amount of sodium nitrate to increase the carburizing effect of such carbonaceous material to thereby materially increase the carbon content and decrease the sulphur content of the iron preparatory to casting.

9. The method herein described of increasing the carbon content and decreasing the sulphur content of cupola melted iron consisting in adding to the molten iron a comminuted mixture of a carbonizing substance and a sufficient amount of sodium nitrate to increase the carburizing effect of the carbonizing substance.

10. A method of treating iron preparatory to casting which consists in melting a batch of iron having a large percentage of scrap in a cupola, withdrawing the molten iron from the cupola, stirring a mixture of carbonaceous material and sodium nitrate into said molten iron to substantially instantaneously increase the carbon content thereof, the mixture having a sufficient amount of carbonaceous material to raise the carbon content to approximately that of blast furnace pig iron and a sufficient amount of sodium nitrate to increase the carburizing effect of the carbonaceous material.

11. The method of increasing the carbon content of cupola melted iron which consists in adding a carbonaceous material in excess of the amount theoretically needed to secure the desired carbon content to the iron in the presence of a sufficient amount of sodium nitrate to materially increase the carburizing effect of said carbonaceous material.

THEODORE TAFEL, Jr.